April 27, 1943.  W. P. LEAR  2,317,622
DRAG DEVICE FOR ANTENNAS
Original Filed April 5, 1940
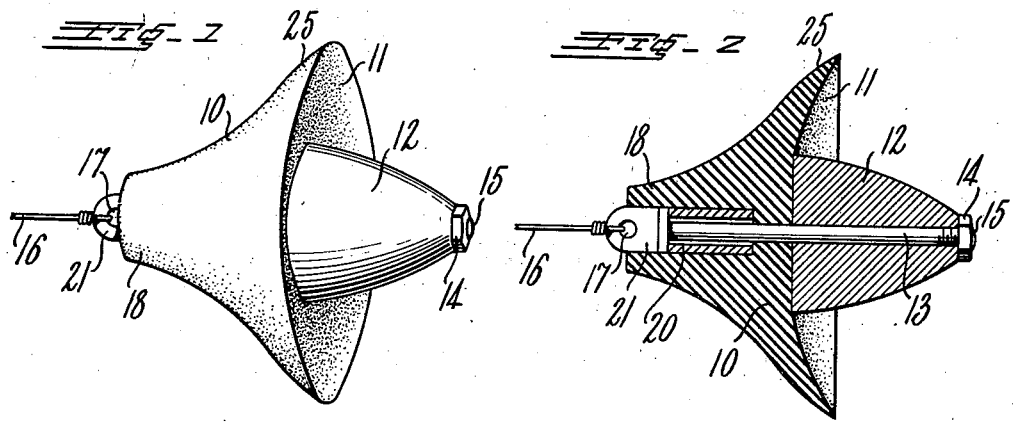
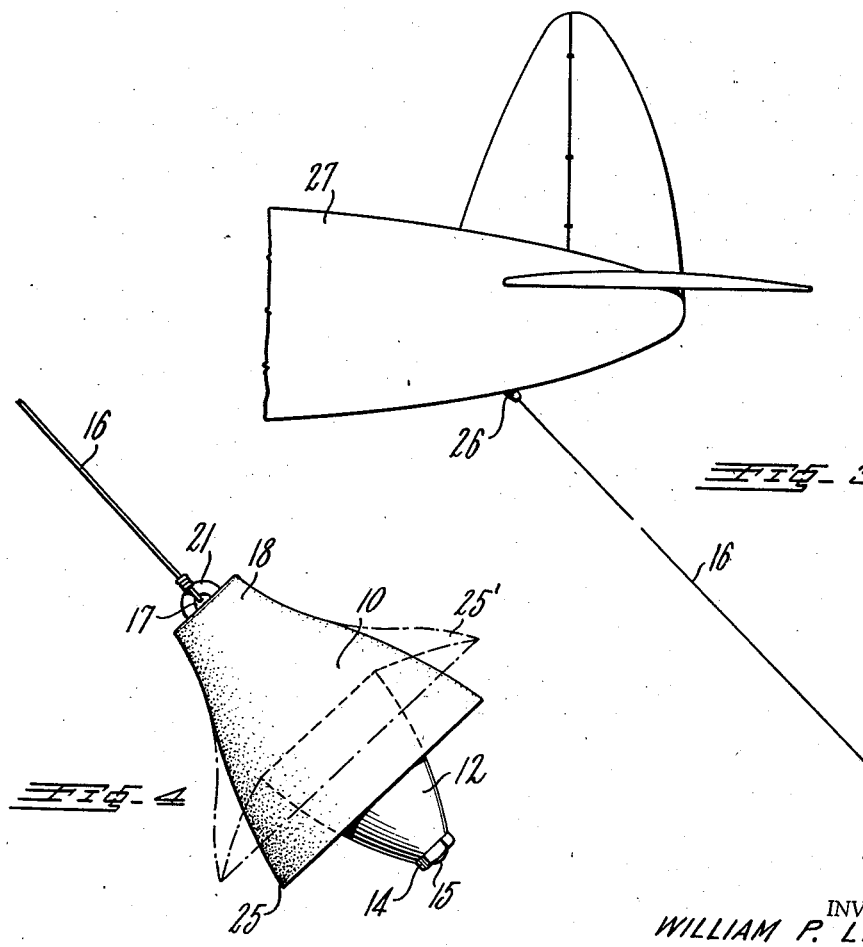
INVENTOR.
WILLIAM P. LEAR
BY Richard A. Marsden
his ATTORNEY

Patented Apr. 27, 1943

2,317,622

UNITED STATES PATENT OFFICE 2,317,622

DRAG DEVICE FOR ANTENNAS

William P. Lear, Piqua, Ohio, assignor, by mesne assignments, to Lear Avia, Inc., Piqua, Ohio, a corporation of Illinois Original application April 5, 1940, Serial No. 327,984. Divided and this application January 22, 1942, Serial No. 427,713

7 Claims. (Cl. 250—33)

This invention relates to reelable antenna systems, and more particularly to drag-type weighted antennae for aircraft. This case is a division of my copending application "Antenna drag cup," Serial No. 327,984, filed April 5, 1940, now Patent 2,287,257 which is assigned to the same assignee.

Generally there are two types of reelable radio antennae for aircraft. In one type, the antenna wire is drawn out and held suspended by a streamline weight, or lead "fish." Such arrangement has the advantage of affording a substantial vertical antenna component for the efficient transmission and reception of radio waves. In the other type, the end of the antenna wire is attached to a drag-cup or wind-sock. In the latter case, the wire is held substantially horizontally by the wind pressure on the drag-cup while the aircraft is in flight, giving only a relatively small vertical component.

The drag-type weighted antenna of the present invention combines the advantages of both the prior types, and derives additional ones. The invention drag device combines both a drag-cup and a streamline weight in a novel manner. The weight is secured with the cup, and extends from a hollow section thereof with decreasing cross-section. The cup is preferably of resilient rubber, and is shaped so that a vacuum is created behind it when drawn through the air. Also, the resilient cup protects the aircraft from any damage due to impacts by the weight.

The antenna is reeled out when the aircraft is in flight. The action of gravity due to the weight portion, together with the drag on the cup portion by the wind pressure, effectively draws out the antenna. When the antenna is unreeled to the desired length, the air drag on the cup collapses it upon the weight portion. The cross-section of the cup against the wind is thus decreased, resulting in a smaller aerodynamic resistance.

Also, the drag device of the invention maintains the antenna wire at about a predetermined angle for given velocities of the aircraft. The angle is determined by the vertical component of gravity acting on the weight and the extended wire, and the horizontal component of the aerodynamic drag on the device. Therefore, the antenna has an advantageous vertical component for efficiently receiving and transmitting radio signals. Since the drag-cup changes its shape in correspondence with the speed of the aircraft, the drag horizontal component will be substantially constant over normal speed changes, resulting in a fairly constant antenna angle and operating efficiency.

These and further objects, advantages and capabilities of the present invention will become more apparent in the following description of a preferred embodiment thereof, illustrated in the drawing, in which:

Fig. 1 is an elevational view of the antenna drag device.

Fig. 2 is a cross-sectional view of the drag-cup of Fig. 1.

Fig. 3 illustrates an aircraft antenna unreeled with the drag device.

Fig. 4 is an elevational view of the antenna drag cup as it appears in flight conditions.

Referring to the drawing, the drag device of the invention comprises a drag-cup 10 having a hollow spherical section 11. Cup 11 is preferably made of a light-weight resilient rubber material. A tapered or egg-shaped weight 12 is secured to cup 10 by eye-bolt 13 extending centrally through cup 10 and weight 12. A nut 14 is secured to the end of bolt 13, adjacent the far end of weight 12. Tip 15 of bolt 13 is peened over nut 14. The end of antenna wire 16 is secured to eye 17 of bolt 13 at a point adjacent extending tip 18 of cup 10. A metal bushing 20 surrounds the section of bolt 13 within cup 10.

The assembly of cup 10 with weight 12 is accomplished by tightening nut 14 on the threaded portion of bolt 13, and pressing head 21 of the bolt against the internal bushing 20. The juxtaposition of weight 12 against cup 10 at central section 11 is along a flat section of relatively large area. A suitable material for weight 12 is lead. The tapering of weight 12, diminishing in diameter as it extends away from cup 10, is designed so as to least interfere with the drag action by cup 10 and hollow section 11, and also be streamline for minimum air drag resistance.

As the drag assembly is moved through the air when craft 27 is in flight, a vacuum is developed behind cup 10 at its hollow section 11 producing an aerodynamic force on the wire 16 and reel. This force is an outward pull on wire 16, which assists in readily unreeling the antenna by the drag device to any desired length. Weight 12 serves to carry the drag device and antenna end beneath the aircraft by its gravity action. The combination of the gravity action of weight 12 and the horizontal aerodynamic force on cup 10 constitutes a substantial unreeling force acting on antenna wire 16.

As the speed of aircraft 27 increases, circular rim 25 of cup 10 is compressed towards and about weight 12, as shown in Fig. 4. The dotted line position 25' in Fig. 4 indicates the normal (static) shape of drag cup 10. Cup rim 25 may be partially collapsed as wire 16 is reeled out to the desired length. As rim 25 is collapsed towards the axis of cup 10, and about weight 12, the horizontal drag component thereon is gradually reduced, tending to stabilize the position of the drag cup assembly beneath the aircraft. Hence, during normal flight conditions, wire 16 extends at substantially a given angle below the aircraft. The angle is dependent on the resilience of the cup 10, the weight of 12 and the air speed.

The angle which wire 16 forms with the axis of the aircraft is such that as long as the aircraft is in flight, the vertical component of the antenna 16 is significant to efficiently receive or transmit radio waves. Furthermore, the angle, and therefore antenna efficiency, is stable over widely varying conditions of flight due to the compensating feature of the resilient cup.

Upon retraction of the antenna and drag-cup assembly, rubber tip 18 abuts the opening in fairlead 26 arranged on the aircraft fuselage 27. Thus the shock of the impact is directly absorbed thereby on the full retraction. Fairlead 26 is preferably of a ceramic material to minimize radio frequency losses. Another important feature is that the resilient cup 10 protects the aircraft from any damage which may occur by the weight portion 12 against the aircraft. The cup 10 surrounds the weight 12 and extends therefrom, so that the rubber cup touches the aircraft body before the weight, and shields it from damage.

Although I have described a preferred embodiment for carrying out the principles of my present invention, it is to be understood that modifications may be made therein without departing from the broader spirit and scope thereof, as expressed in the appended claims.

I claim:

1. An antenna drag device comprising a resilient cup having an end portion for securement to an antenna wire, and a weight secured to said cup is coaxial alignment therewith and projecting therefrom in the direction opposite said end portion.

2. An antenna drag device comprising a resilient cup having an end portion for securement to an antenna wire, and a weight secured to said cup in coaxial alignment therewith and projecting therefrom in the direction opposite said end portion, said weight extending from said cup with narrowing cross-section.

3. An antenna drag device comprising a resilient rubber cup having an outer rim containing a hollow section and a tip extending away from said section, and a weight secured to said cup against the central part of said section away from said tip.

4. An antenna drag device comprising a resilient rubber cup having an outer rim containing a hollow section and a tip extending away from said section, and a weight secured to said cup against the central part of said section, said weight longitudinally extending from said cup with diminishing cross-section, said rim being forced about said weight when subjected to wind pressure.

5. An antenna drag device comprising a resilient rubber cup having a hollow portion, a streamline weighted section secured to said cup and extending therefrom with diminishing diameter, and means for holding the device in stable assembly comprising a bolt passing longitudinally through said cup and weight section.

6. An antenna drag device comprising a resilient rubber cup having a hollow portion, a weighted section secured to said cup against said portion and extending therefrom with diminishing cross-section, and means for holding the device in stable assembly comprising a bolt passing longitudinally through said cup and weighted section, a bushing within said cup juxtaposed against the head of said bolt, and a nut on said bolt at the exterior end of said section.

7. An antenna drag-type device comprising a resilient rubber cup having a circular outer rim containing a hollow spherical section and a tip extending away from said section, a weight having a flat portion juxtaposed with the central part of said section and extending longitudinally therefrom with diminishing cross-section, and securing means extending axially through said cup and weight comprising a bushing imbedded in said cup coacting with a head on said means for holding said device in stable assembly, said rim being forced about said weight when subjected to wind pressure.

WILLIAM P. LEAR.